United States Patent
Barnes

(10) Patent No.: US 7,827,729 B2
(45) Date of Patent: Nov. 9, 2010

(54) PORTABLE FISHING POLE HOLDER

(75) Inventor: Richard Barnes, Fairborn, OH (US)

(73) Assignee: Piscatores, LLC, Fairborn, OH (US)

( * ) Notice: Subject to any disclaimer, the term of this patent is extended or adjusted under 35 U.S.C. 154(b) by 0 days.

(21) Appl. No.: 12/128,645

(22) Filed: May 29, 2008

(65) Prior Publication Data
US 2008/0295382 A1     Dec. 4, 2008

Related U.S. Application Data

(60) Provisional application No. 60/932,262, filed on May 30, 2007.

(51) Int. Cl.
*A01K 97/00*     (2006.01)
(52) U.S. Cl. .............. 43/21.2; 43/4.5; 248/530
(58) Field of Classification Search ........... 248/530; D22/147; 43/21.2, 4.5
See application file for complete search history.

(56) References Cited

U.S. PATENT DOCUMENTS

| | | | | |
|---|---|---|---|---|
| 2,209,504 A | * | 7/1940 | Beiter | 248/530 |
| 2,652,999 A | * | 9/1953 | Lohmar | 248/530 |
| 2,785,494 A | * | 3/1957 | Eaton | 43/17 |
| 3,586,274 A | * | 6/1971 | Hart | 248/530 |
| D221,279 S | * | 7/1971 | Erickson | D22/147 |
| 3,623,685 A | * | 11/1971 | Thomson | 248/511 |
| 3,858,833 A | * | 1/1975 | Fink | 248/533 |
| D234,355 S | * | 2/1975 | West | D22/147 |
| 4,479,628 A | * | 10/1984 | Albright | 248/530 |
| 4,611,427 A | * | 9/1986 | Coutcher | 43/21.2 |
| 5,187,891 A | * | 2/1993 | Stanishewski | 43/21.2 |
| D346,638 S | * | 5/1994 | Streeter | D22/147 |
| D353,871 S | * | 12/1994 | Short | D22/147 |
| D363,530 S | * | 10/1995 | Dalley | D22/147 |
| 5,488,798 A | * | 2/1996 | Beachel | 43/21.2 |
| 2005/0144829 A1 | | 7/2005 | Gonzales | |
| 2005/0145664 A1 | | 7/2005 | Fappiano | |
| 2006/0086883 A1 | | 4/2006 | Moses | |
| 2007/0089351 A1 | | 4/2007 | Higgins | |
| 2008/0016750 A1 | * | 1/2008 | Benton | 43/21.2 |

* cited by examiner

*Primary Examiner*—Christopher P Ellis
(74) *Attorney, Agent, or Firm*—John Lindsay

(57) ABSTRACT

A portable fishing pole holder is a device for supporting a fishing pole without manually holding the pole. It is a substantially "Y" shaped frame which further comprises a support and an anchor. The support contains the fishing pole. The anchor secures the fishing pole holder. Optionally, the fishing pole holder includes a bridging member to more securely contain the fishing pole. The an anchor for securing the in which the fishing pole is placed while fishing. The other end is used to anchor the device. Optionally, it has members to more securely support the fishing pole or to more securely anchor the device.

7 Claims, 5 Drawing Sheets

PORTABLE FISHING POLE HOLDER

PRIORITY

The present invention claims priority to provisional application 60/932,262, which has a filing date of May 30, 2007.

BACKGROUND

1. Field of the Invention

The present invention relates to fishing pole holding devices, more specifically fishing pole holding devices which are portable.

2. Description of the Related Art

An individual might wish to fish at a remote destination which can be a significant distance from a car, boat or cabin. Once the individual reaches the fishing destination, he might seek to place fishing bait secured to fishing line and fishing pole in the water. After placing the bait in the water, the fishermen would like to be free from manually holding the fishing pole, yet keep the fishing pole in sight to see any motion on the fishing line or pole and to minimize the risk of losing the pole to a fish while it is not held. Currently, a fishermen would be forced to lean the fishing pole against a rock or on the ground. For the foregoing reasons, such a person would find it helpful to have a portable fishing pole holder.

SUMMARY

The present invention is directed to a fishing pole holder that can be carried by a fisherman. Embodiments of the invention are directed to a device that satisfies the need for a portable device that supports fishing poles without the need of the fisherman to manually hold the fishing pole while fishing. These embodiments can be quickly and conveniently anchored and unanchored without the use of additional tools. These embodiments allow fishing poles to be placed so that the fishing pole and fishing line can be easily monitored by the fisherman.

These and other features, aspects, and advantages of the invention will become better understood with reference to the following description, appended claims, and accompanying drawings.

DETAILED DESCRIPTION

Figure 1:
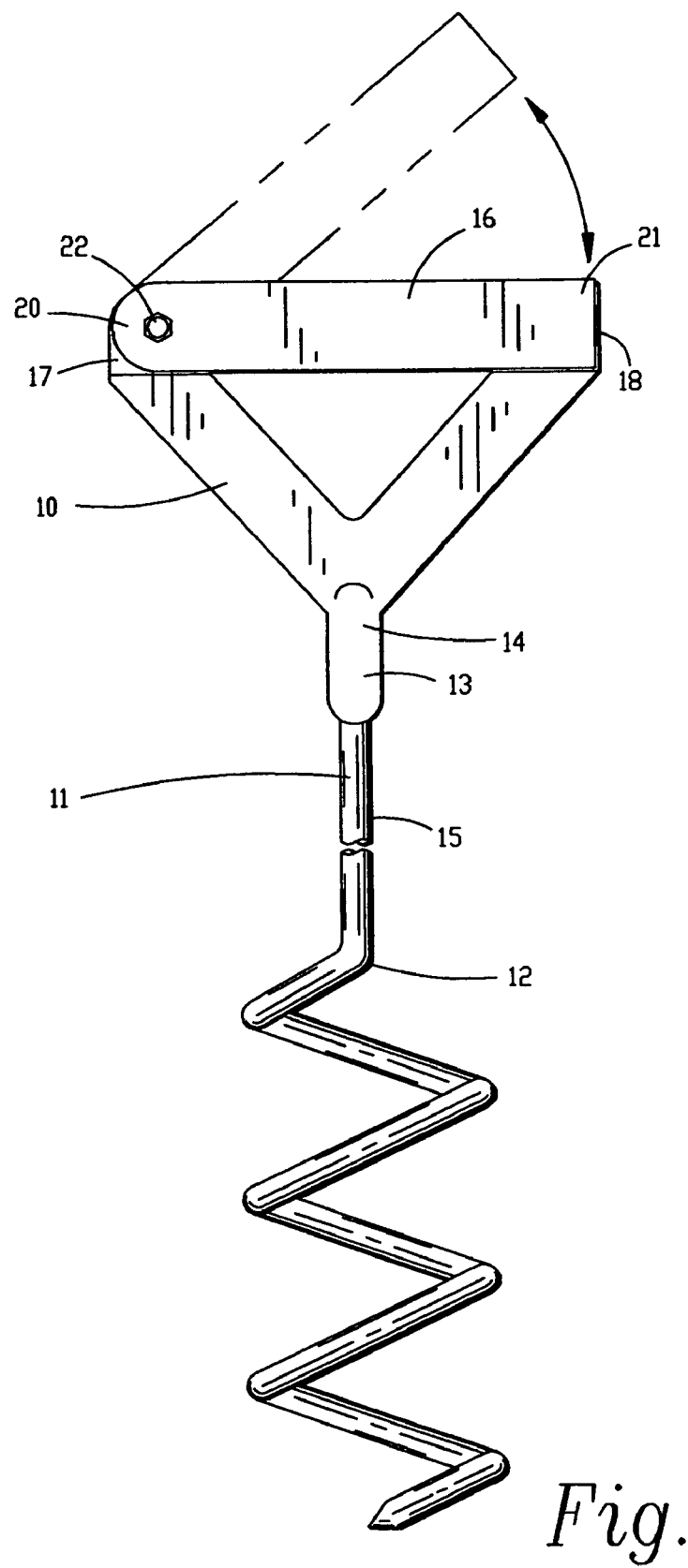
FIG. 1 shows a front side view of an embodiment of the invention.
Figure 2:
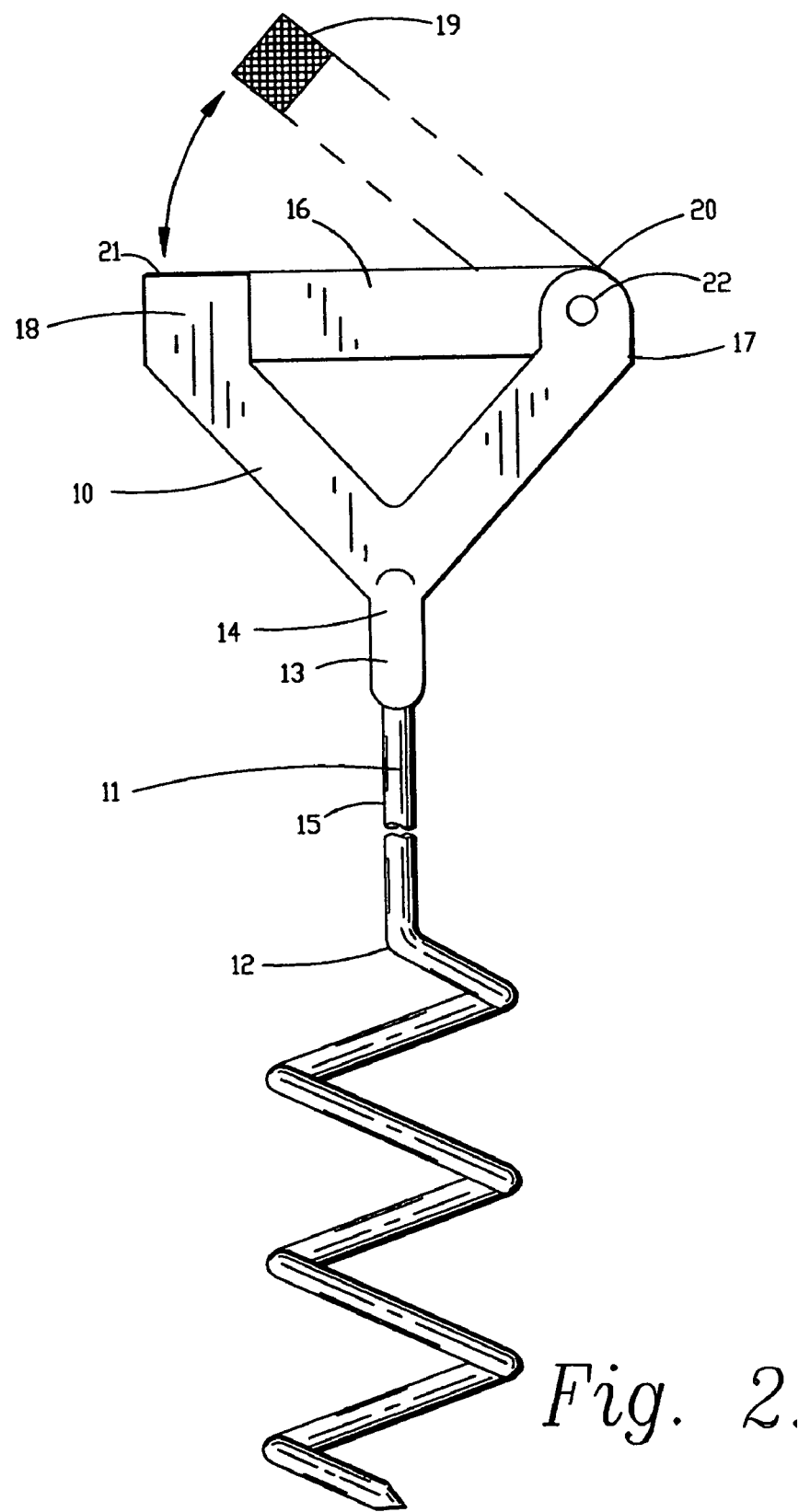
FIG. 2 shows a rear side view of an embodiment of the invention.
Figure 3:
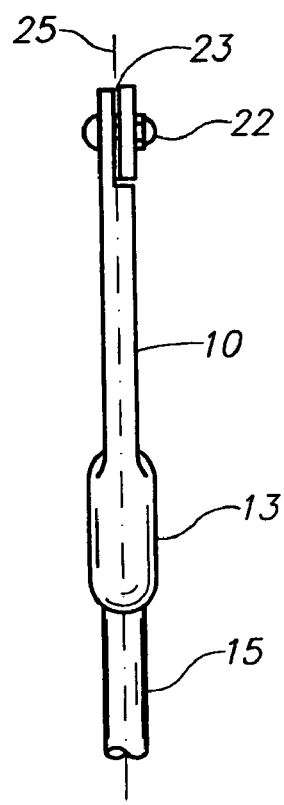
FIG. 3 shows a left side view of an embodiment of the invention.
Figure 4:
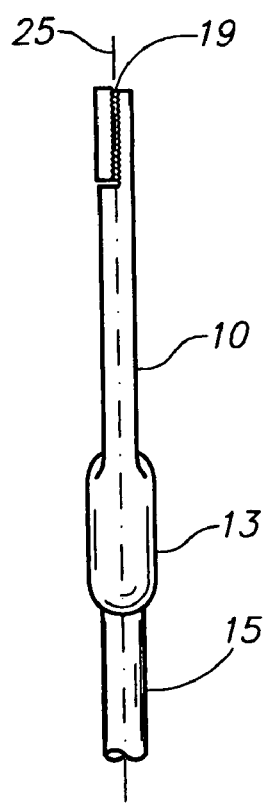
FIG. 4 shows a right side view of an embodiment of the invention.
Figure 5:
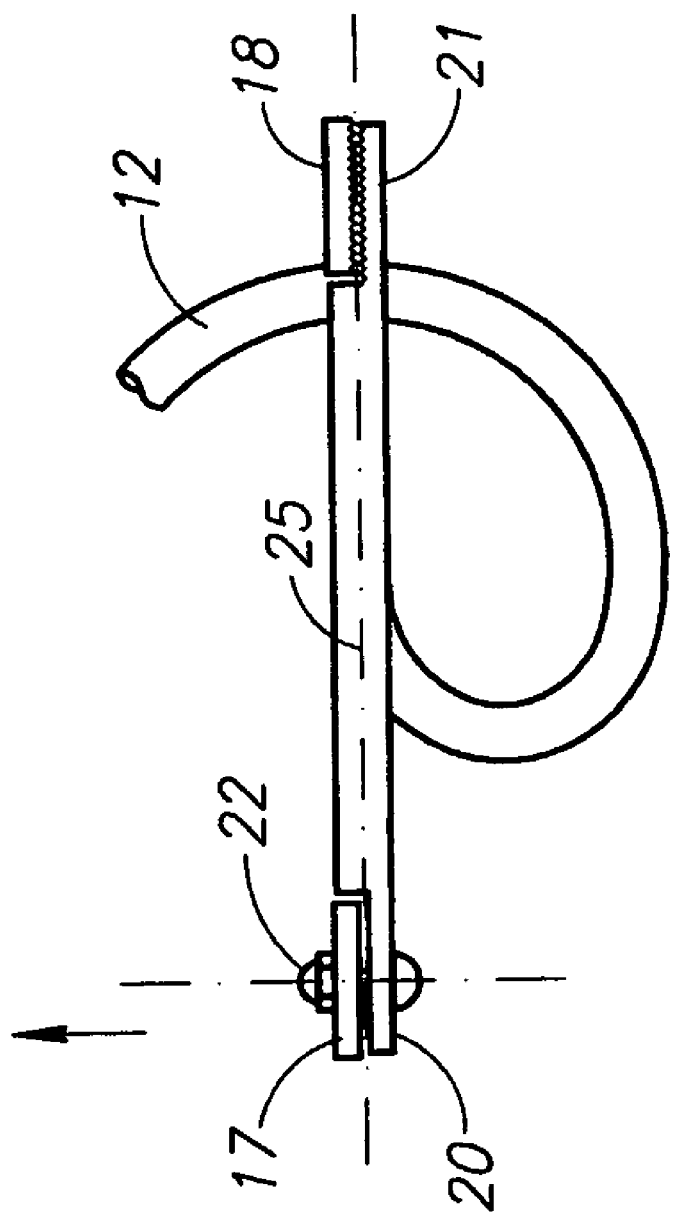
FIG. 5 shows a top view of an embodiment of the invention.
Figure 6:
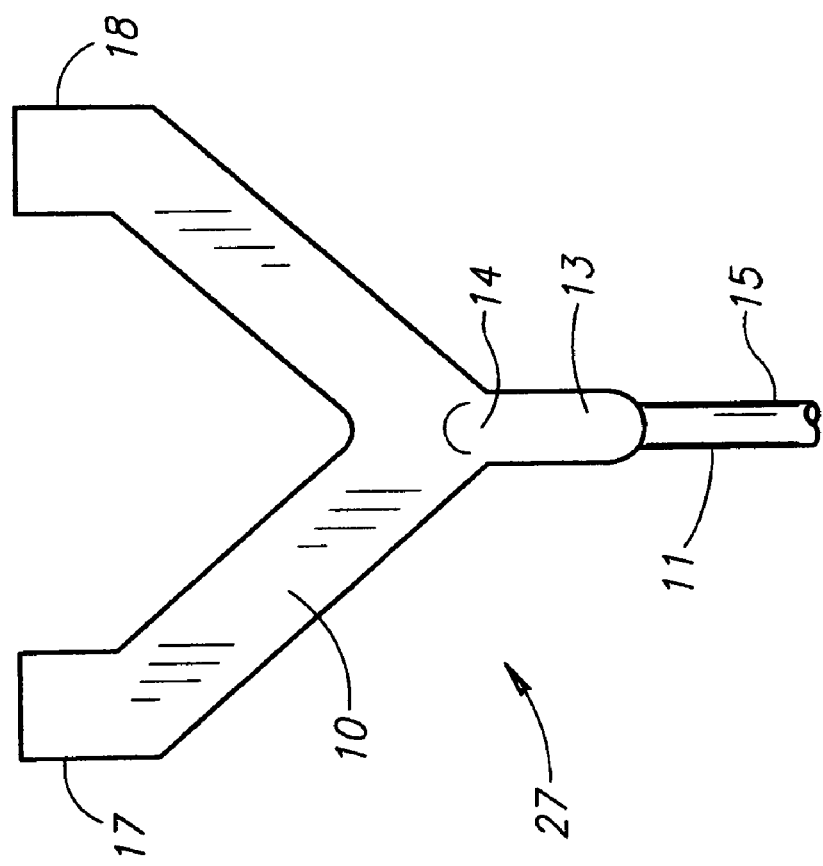
FIG. 6 shows front side view of an embodiment of the invention.

One embodiment of the fishing pole holder comprises a generally "Y" shaped frame 27 which further comprises two members. The first support member 10 is a bent shaft. Optionally, the shaft may be curved. It's unbent length ranges from about 2 to 14 inches. The second anchor member 11 is a substantially straight shaft ranging from about 6 to 60 inches in length. The first end 13 of the second member 11 is joined to the first member 10, preferably at the elbow 14 of the first member 10. The second end 15 of the second member 11 extends downwardly from the first member 10. The two members 10 11 may be composed of any rigid material, including wood, ceramics, polymers, or metals.

A second embodiment of the fishing pole holder comprises a generally "Y" shaped frame 27 and an additional bridging member 16. The frame 27 further comprises two members 10 11. The first support member 10 is a bent shaft with slots on both ends. Optionally, the shaft may be curved. It's unbent length ranges from about 2 to 14 inches. The second anchor member 11 is a substantially straight shaft ranging from about 6 to 60 inches in length. The first end 13 of the second member 11 is joined to the first member 10, preferably at the elbow 14 of the first member 10. The second end 15 of the second member 11 extends downwardly form the first member 10. The additional bridging member 16 is a straight shaft with recessed ends. Its length varies, being long enough to bridge the two ends 17 18 of the first member. When this second embodiment is used, the recessed ends of the additional bridging member are placed into the slots of the first member. Those skilled in the art would appreciate methods other than a slot and recess pairing to secure the two members. All members may be composed of any rigid material, including wood, ceramics, polymers, or metals.

A third embodiment of the fishing pole holder comprises a generally "Y" shaped frame N which further comprises three members 10 11 12. The first support member 10 is a bent shaft. Optionally, the shaft may be curved. It's unbent length ranges from about 2 to 14 inches. The second anchor member 11 is a substantially straight shaft ranging from about 6 to 60 inches in length. The first end 13 of the second member 11 is joined to the first member 10, preferably at the elbow 14 of the first member 10. The second end 15 of the second member 11 extends downwardly from the first member 10. The third member 12 is spiral shaped and extends downwardly from the second end 15 of the second member 11. The height of the spiral should be about 2 to 24 inches and the diameter of the spiral should be about 1 to 12 inches. All members may be composed of any rigid material, including wood, ceramics, polymers, or metals.

A fourth embodiment of the fishing pole holder comprises a generally "Y" shaped frame 27 which further comprises three members 10 11 12.

The first support member 10 is a bent shaft with a gripping surface on one end. Optionally, the shaft may be curved. At least a portion of the gripping surface has small grooves, The grooves give the gripping surface the consistency of a textured surface material such as sandpaper or a file. The first member's 10 unbent length ranges from about 2 to 14 inches. The second anchor member 11 is a substantially straight shaft ranging from about 6 to 60 inches in length. The first end 13 of the second member 11 is joined to the first member 10, preferably at the elbow 14 of the first member 10. The second end 15 of the second member 11 extends downwardly from the first member 10. A third bridging member 16 is a substantially straight shaft with a second gripping surface 19 on one end. Its length varies, being substantially the distance between the ends 17 18 of the first member 10.

The second end 17 of the first member 10 is joined to the second end 20 of the third member 16. One method of joining the ends 17 20 is via a hinge 22 such that the third member 16 rotates in a manner substantially coplanar with the first and second members 10 11. The selected hinge 22 should provide sufficient resistance to handle the erratic motion of a fishing pole when it is placed inside the enclosure created by hinging the first and third members 10 16. Optionally, the selected hinge 22 can have play 23 so that the hinged end 20 of the third member 16 can move slightly out of plane 25. This play allows additional motion of the fishing pole within the fishing pole holder, enhancing the ability to monitor the fishing pole for activity. Additionally, the play allows less resistance on the fishing line, enhancing the ability to catch fish, who may be sensitive to the resistance on fishing line when engaging the bait. All members may be composed of any rigid material, including wood, ceramics, polymers, or metals. However, the preferred material is stainless steel.

In the above embodiment, the fisherman would first carry the fishing pole holder to a desired location and anchor the device into the ground. Then he would open the unhinged end 21 of the third member 16. Next, he would place the fishing pole vertically next to the device, leaning part of the fishing pole into the elbow 14 in the first member 10. Finally, the unhinged end 21 of the third member 16 is closed, leaving the fishing pole secured in the enclosed region. The fisherman is then free to move about and can monitor the fishing pole for activity.

While the foregoing detailed description has disclosed several embodiments of the fishing pole holder, it is to be understood that the above description is illustrative only and not limiting of the disclosed invention. For example, one embodiment uses grooves 19 to secure the members' 10 16 ends. However, other options may include surface to surface contact with smooth nongripping surface ends, matching slots, matching corrugated ends, or other means in the art. For example, one embodiment uses a hinge 22 to join the members 10 16. However, other options to join the members 10 16 may include riveting, a prefabricated screw and bolt, or other means in the art. For example, an embodiment uses a spiral shaped member 12 as an anchor. However, other options for an anchor may include a straight sharpened end, a set of legs configured as a tripod, or other means in the art. It will be appreciated that the discussed embodiments and other unmentioned embodiments may be within the scope of the invention.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A portable fishing pole holder comprising:
   a generally "Y" shaped frame which further comprises two members;
   a first support member, having a first end and a second end, comprising a bent or curved shaft;
   a second anchor member, having a first end and a second end, comprising a substantially straight shaft joined to said support member, said anchor member extending downwardly from said support member;
   a bridging member which depends from said first end of said support member to said second end of said support member forming an enclosure, a first end of said bridging member being fastened to said first end of said support member forming a hinged end;
   wherein said hinged end is allowed to slidably move substantially orthogonally relative to a plane defined by said support member, enabling said hinged end to move slightly out of said plane defined by said support member, thereby enhancing the ability to visually monitor the motion of an engaged fishing pole and allow varying resistance of the engaged fishing pole.

2. The device of claim 1 wherein a free end of said bridging member has a grooved surface.

3. The device of claim 1 wherein a free end of said bridging member has a textured surface.

4. The device of claim 1 wherein the second end of said support member has a grooved surface.

5. The device of claim 1 wherein the second end of said support member has a textured surface.

6. The device of claim 1 wherein a free end of said support member and the second end of said bridge member are frictionally engaged.

7. The device of claim 1 wherein said anchor is helical thereby forming a helix, said helix having an inner volume defining a hollow space, wherein the diameter and pitch of said helix are dimensioned to provide an optimum resistance.

* * * * *